No. 689,641. Patented Dec. 24, 1901.
R. J. DOUTHETT.
ANIMAL TRAP.
(Application filed Mar. 22, 1901.)

(No Model.) 3 Sheets—Sheet 1.

No. 689,641. Patented Dec. 24, 1901.
R. J. DOUTHETT.
ANIMAL TRAP.
(Application filed Mar. 22, 1901.)
(No Model.) 3 Sheets—Sheet 2.

Witnesses:
Inventor
R. J. Douthett.

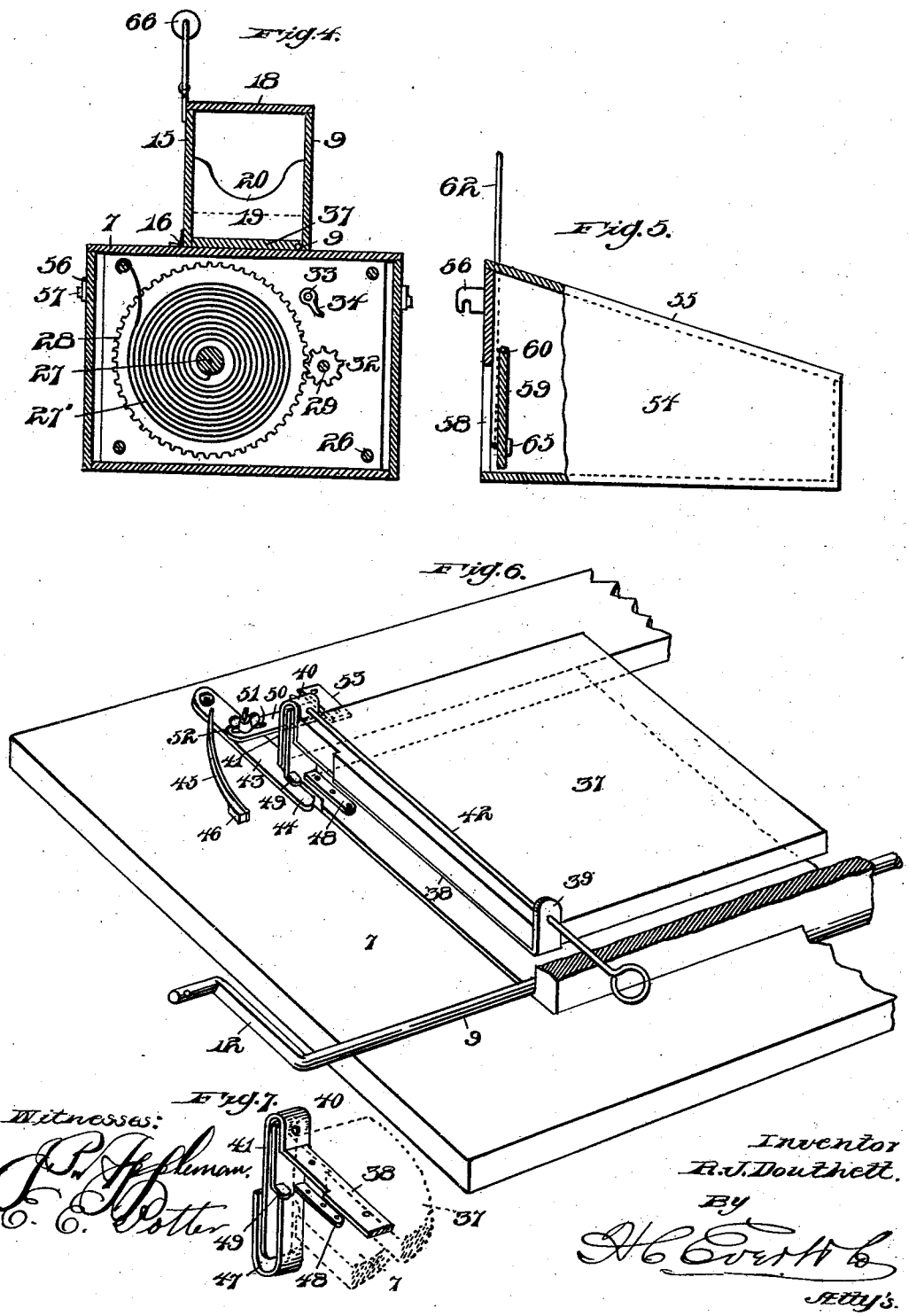

UNITED STATES PATENT OFFICE.

RICHARD J. DOUTHETT, OF SHARPSBURG, PENNSYLVANIA.

ANIMAL-TRAP.

SPECIFICATION forming part of Letters Patent No. 689,641, dated December 24, 1901.

Application filed March 22, 1901. Serial No. 52,325. (No model.)

*To all whom it may concern:*

Be it known that I, RICHARD J. DOUTHETT, a citizen of the United States of America, residing at Sharpsburg, in the county of Allegheny and State of Pennsylvania, have invented certain new and useful Improvements in Animal-Traps, of which the following is a specification, reference being had therein to the accompanying drawings.
This invention relates to certain new and useful improvements in animal-traps, and has for its main object to construct a trap which will automatically reset itself after being sprung, so as to be in position for operation again.

In addition to the main object stated the invention aims to construct a trap with means whereby the animals caught therein may be removed from the box or casing of the trap with the latter allowed to remain in set position ready for operation.

Briefly described, the invention comprises a box or casing which has a tilting section or platform that is operated to be released by the animal in its passage to the bait. This tilting section is so constructed that when the trigger mechanism is released the tilting section deposits the animal into the box or casing, and connected to this tilting section is a mechanism for automatically returning the same to its normal or "set" position ready for operation again, the tilting section when set closing the outlet for the animal. Means are provided for adjustably setting the trigger mechanism, so that the same may be made to work under a desired pressure. In connection with the main box or casing I provide a removable supplemental box or casing, which is detachably connected to the main box or casing, there being an opening in the rear end of the main box or casing and an opening in the registering end of the supplemental box or casing, with a separate door in each casing or box, whereby the openings may be each closed when the two boxes or casings are detached.

Various other novel features of construction enter into my invention in addition to those stated briefly above, and all of these features will be hereinafter more specifically described and then particularly pointed out in the claims, and in describing the invention in detail reference is had to the accompanying drawings, forming a part of this specification, and wherein like numerals of reference indicate like parts throughout the several views, in which—

Figure 1:
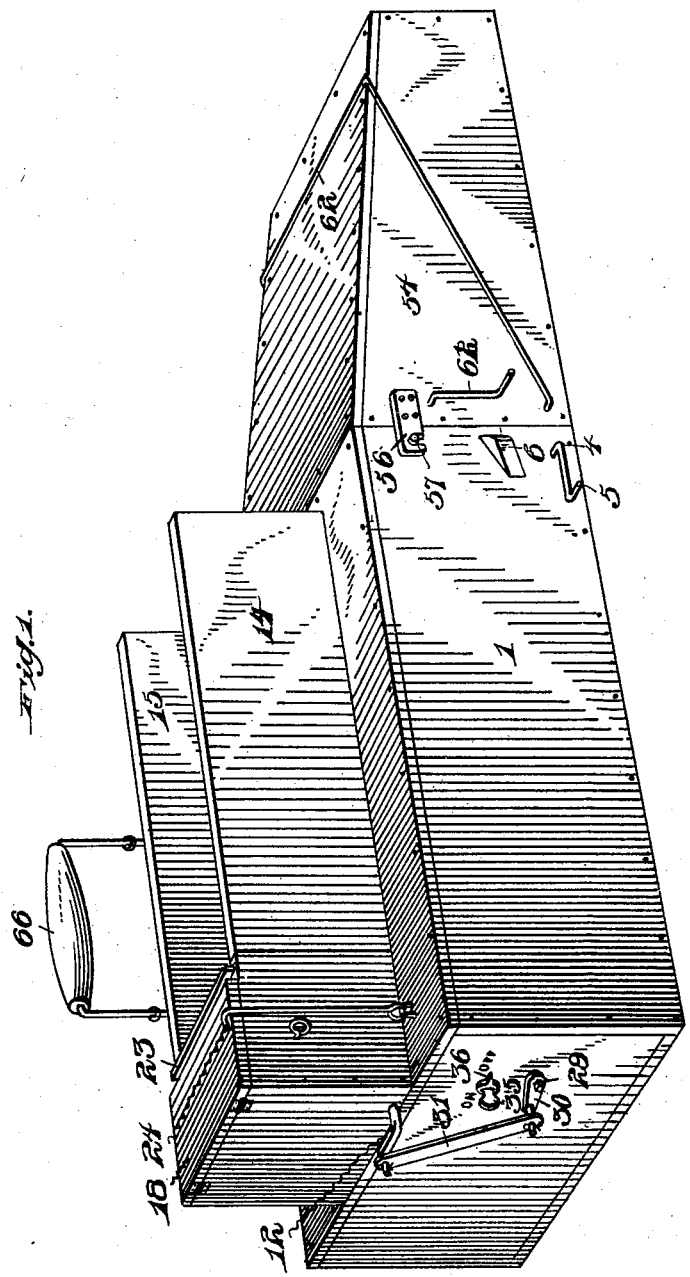
Figure 2:
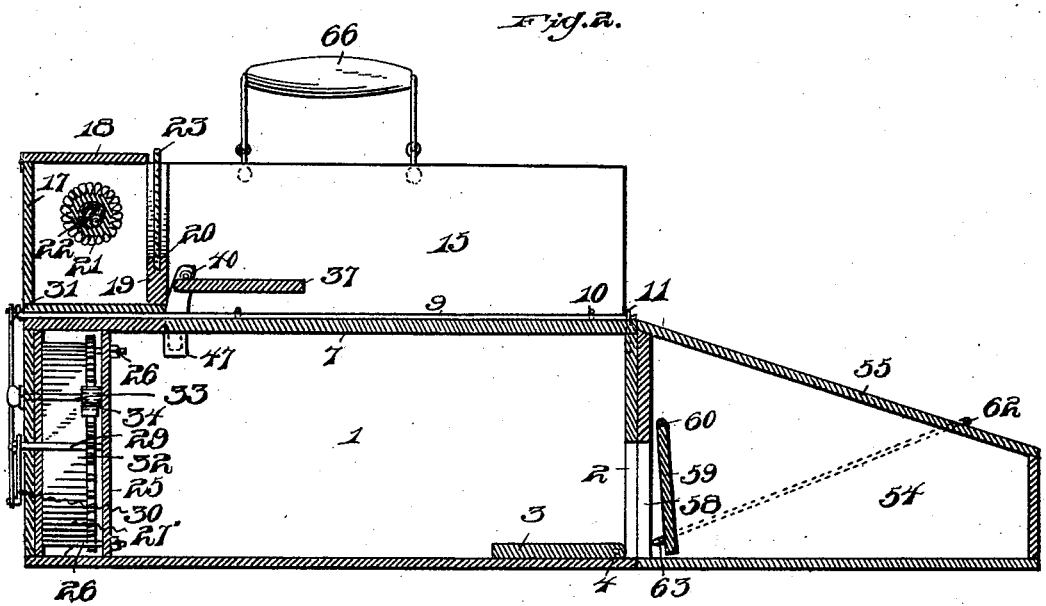
Figure 3:
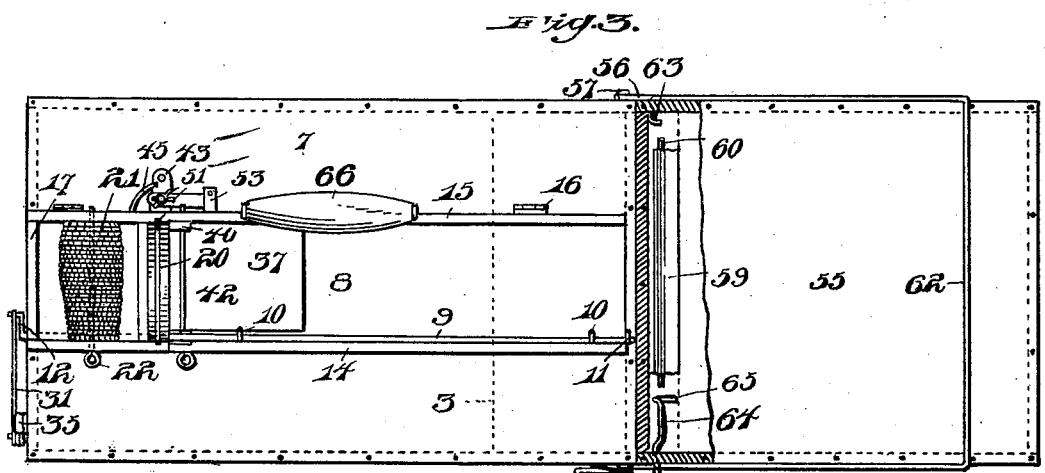
Figure 3A:
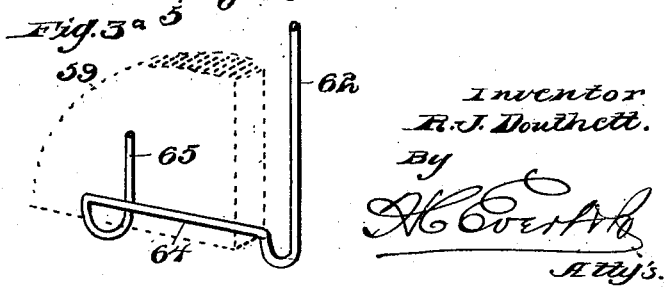

Figure 1 is a detail perspective view of my improved animal-trap, showing the same in the set position. Fig. 2 is a longitudinal sectional view thereof in the same position. Fig. 3 is a top plan view of the trap in the set position, partly broken away. Fig. 3ª is a detail perspective view of a part of the bail of the supplemental box. Fig. 4 is a transverse vertical sectional view. Fig. 5 is a side elevation, partly in vertical section, of the supplemental box or casing removed from the trap. Fig. 6 is a detail perspective view of a part of the top of the main box or casing of the trap, a part of the tilting platform or section, also showing the trigger mechanism. Fig. 7 is a detail perspective view of a part of the setting mechanism.

To put my invention into practice, I provide a suitable box or casing 1, which may be made of any suitable material, and when constructed of wood may, if desired, be lined with tin or other metal, so as to prevent the animals from gnawing through the same. This box or casing in the accompanying illustrations is shown substantially rectangular in form, though, of course, it may be made of other exterior shape, if desired. This box or casing forming the trap is provided in its rear end with an opening or doorway 2, which is closed by a door 3, that is hung upon a rod 4, journaled in the sides of the box or casing and provided on one end with a crank 5. Thus it will be seen that this door may be laid down upon the bottom of the box or casing, as shown in Fig. 2 of the drawings, or the doorway may be closed by means of the door, the latter in this instance being held in the closed position by engaging the crank with a cleat or catch 6, attached to the outside of the box or casing, as shown in Fig. 1.

The top or cover 7 of the box or casing is cut away from its rear end to a point near the forward end of the box or casing, and in this cut-away portion is placed a hinged or swinging platform or section, normally closed and held by trigger mechanism, which is actuated by the animal. The platform 8, which lies within the opening in the top of the box or casing, has secured adjacent to one edge thereof a rod or shaft 9, which may be fastened to the platform by staples 10, as shown, or secured in any other suitable manner. This rod or shaft 9 at the rear end of the box extends slightly beyond the end of the cover and enters in an aperture provided therefor in a bracket or standard 11, carried by the rear end wall of the box or casing. This rod or shaft 9 extends out beyond the forward end of the box or casing and is formed on this end with a crank 12. The platform 8 has secured to the edge adjacent to the rod or shaft 9 a side wall 14, which operates with the platform, and when the latter is tilted or swung downward into the box or trap this side wall closes the opening normally occupied by the platform when the trap is set. A like side wall 15 is secured by hinges 16 to the top or cover of the box or casing along the opposite edge of the platform 8, and this side wall 15 has connected thereto the feed or bait box 17. This feed or bait box 17 is or may be provided with a hinged cover 18, being therefore closed on two sides and on the one end. At its other end it is partially closed by a plate 19, cut away, as shown at 20, so as to permit the displaying to view of the bait. In the accompanying illustrations I have shown an ear of corn 21 as the bait, which is suspended within the bait-box by means of a rod 22, passed through the sides of the box and through the pith of the cob. This bait, it will be observed, may be viewed by the animal through the opening 20 in the end of the bait-box as the animal passes up along the platform 8. In the present illustration I have shown the plate 19 provided with a groove, which also extends into the side walls of the bait-box, and in this groove I may place a looking-glass 23, and where this is is done dispense with the bait. The feed or bait box and the side wall 15 are locked in the position in which they are shown by means of a catch or securing-rod 24, provided at its upper end with a hook to engage with the cover of the bait-box, as shown in Fig. 1, and at its lower end swiveled in an eyelet or staple carried by the top or cover of the box or casing 1.

Mounted in the forward end of the box or casing 1 is a pair of side-plates 25, spaced apart and connected to the end of the box or casing by stay-bolts 26, as shown. Journaled in these plates 25 is a shaft 27, upon which is mounted a gear-wheel 28, adjacent to the inside plate. A stiff drum-spring 27' is wound upon this shaft 27, having its inner end connected to said shaft, and its outer end secured to one of the stay-bolts 26, as shown in Fig. 2. The shaft 29 is journaled in the plates 25 and extends through the outer end of the box or casing 1 and has connected to the outer end thereof a crank 30. The cranks 12 and 30 are connected by a link or pitman-rod 31, the latter being fastened on the cranks by keys, as shown, or in any other manner in which the fastening may be readily removed. The shaft 29 has mounted thereon a pinion 32, which meshes with the gear 28. A rod or shaft 33 is mounted in the plates 25 and carries a pawl 34, by means of which the gear-wheel 28 may be held against backward movement when desired. The rod or shaft 33 extends through the forward end of the box and is provided with a suitable knob or handle 35 for operating the same. This rod or shaft carries an indicator or pointer 36, and the box has marked thereon suitable inscriptions—"On," "Off"—so that the position of the pawl 34 may be readily determined.

The tilting or swinging section of the trap is held in the normal or set position by means of a trigger mechanism, which will now be described: This trigger mechanism comprises a releasing plate or treadle 37, which is located above the tilting or swinging platform 8 directly in front of the feed or bait box 17. This plate or treadle is secured at its inner end to the strap 38, which extends along the underneath face of the plate and has its one end turned upwardly, as at 39. The opposite end of this strap is also struck upwardly, as at 40, and is then carried downwardly to form an arm 41, adapted to release the trigger from its set position, as will be hereinafter more fully explained. The upwardly-turned ends 39 40 of the strap 38 are provided with apertures to receive the rod 42, extending through the side wall 14, ends 39 40, and arm 41, with its one end extending out some distance beyond the wall 14 and provided with a suitable handle on its outer end, so that the rod may be readily removed when desired. Secured to the top of the box or casing 1 is a bar or plate 43, pivoted at its outer end and having a tongue 44, which lies partially over the openings at the end thereof in which the platform or swinging section 8 is arranged. This bar or plate is under tension of a spring 45, having its one end connected to said bar, with its other end extended in the block 46, carried on the upper face of the box or casing. Secured to the tilting or swinging platform 8, on its inner end, is a guide for the arm 41, and also a catch or support for holding the tilting or swinging platform in its normal position. This guide is formed of a suitable strip of metal bent in substantially U-shaped form, as shown at 47 in Fig. 7. The one end of this strip extends upwardly within the inverted-U-shaped end 40 of the strap 38 and is provided with an aperture, which registers with the aperture in said end 40 to receive the rod 42. The strap has an extending bracket-arm 48, which is rigidly secured to the upper face of the tilting or swinging platform 8, and substantially in alinement with this bracket or securing-arm 48 is a lug or seat 49, which is adapted to engage with the upper face of the arm 44 to hold the platform 8 in the set position. The engagement of the lug 49 with the arm 44 is varied by the adjusting means, consisting of a bar 50, having a slot 51 to receive a set-screw 52, carried by the bar 43. The opposite end of the bar 50 contacts with a stop 53, secured to the upper face of the top or cover of the box or casing 1.

In connection with the main box I preferably employ a supplemental box or casing 54, the top 55 of which is preferably at an incline to the top of the main box or casing 1. This supplemental box or casing may be detachably secured to the main box or casing by a pair of catches 56, which engage over pins 57, carried by the main box or casing 1. This box or casing 54 is provided with a doorway 58, which registers with the doorway 2 in the rear end of the main box or casing 1. This doorway 58 may be closed by means of the door 59, suspended on the rod 60, which is mounted in the sides of the box 54 and is formed on one end with a crank 61. This door 59 may be locked and held against movement by means of the bail 62, which extends across the supplemental box or casing, with its ends extended through the sides thereof at the rear of and near the bottom of the doorway 58. The end 63 of this bail is bent angularly, forming a stop for said door 59, and the other end is carried through the side wall of the box 54 and bowed upwardly, as at 64, to form a like stop for the door 59. The end 65 is carried rearwardly and is curved upwardly in a manner not to prevent the movement of the door 59 when the bail is in position, as shown in Fig. 1, but being sufficiently curved to engage the back of the door 59 and hold the same when the bail is thrown upwardly to a vertical position, as shown in Fig. 5. When in this upright position, it will be observed that the bail forms a lock for the door 59 and also a means for carrying the supplemental box or casing 54. By lowering the bail 62 the door 59 may be free to swing upon its rod 60 and may be manipulated by means of the crank 61.

In describing the operation attention is called to the trap in such position as shown in Fig. 1 of the drawings. When the animal passes into the way between the side walls 14 15 and steps upon the treadle 37, Figs. 2 and 6, the outer end of the treadle is depressed by the weight of the animal, causing the arm 41 to be thrown forwardly into engagement with the arm 44 of the plate 43, thus moving said arm from under the lug 49 and allowing the spring 27' to actuate the shaft 27, gear-wheel 28, and pinion 32 and through the medium of the crank 30, pitman-rod 31, crank 12, and rod 9 tilt or swing the platform 8 downwardly into the main box or casing, the side wall 14 being actuated therewith and closing the opening during the time the platform 8 is within the box or casing 1. The movement imparted to the cranks 12 30 during this operation has been sufficient to throw crank 30 past the center, and in its continued revolution it will return the platform 8 and side wall 14 to the position shown in Fig. 1, and as by this movement the lug 49 is moved slightly above the plate 43 the spring 45 forces the latter rearwardly, so that the arm 44 will be in position to be engaged by the lug 49, thus resetting the trap, and all parts are again in position to be operated when treadle 37 is again depressed. The pawl 29 is provided for the purpose of preventing accidental backward movement or unwinding of the spring 27' as the same is being wound up or being placed under tension. When this spring has been tightly wound and the trap is set, the spring being held by the lug 49 resting on the arm 44, the pawl 34 is thrown out of engagement with the gear 28 and the indicator will point to the inscription "Off."

In handling the trap it is preferable to throw the indicator to the inscription marked "On," so that an accidental displacement of the setting or trigger mechanism would not permit the operation of the trap. The crank 30 is preferably constructed with a wrist-pin of such form that this crank may when the pitman-rod 31 is disconnected therefrom be employed for the winding of the spring 27'. The operation of the shaft 29 by means of the shaft 30 causes the pinion 32 to rotate the gear 28, thus winding the spring 27'. A suitable handle 66 may be attached to the side wall 15 for carrying the trap. It will thus be seen that the trap when sprung automatically resets itself after the depositing of an animal within the main box or casing, the platform 8, crank 30, and side wall 14 making one-quarter of a revolution. The side wall 14 serves to assist in the precipitation of the animal within the box or casing when the trigger mechanism is released, as this side wall operating in connection with the platform 8 would strike the animal and cause it to be precipitated into the box, as would be readily apparent.

Having thus fully described my invention, what I claim as new, and desire to secure by Letters Patent, is—

1. In an animal-trap, the combination of a box or casing provided in its top or cover with an opening, a tilting platform mounted in said opening and normally closing the same, means connected to the platform whereby the same is tilted within the box or casing and returned to its normal position, and means carried by the platform for temporarily closing the opening in the top or cover when the platform is tilted within the box or casing, substantially as described.

2. In combination with a box or casing having an opening in its top or cover, a tilting platform mounted in said opening, spring-actuated mechanism connected to said platform for tilting the same within the box or casing and returning the same to its normal position, means adapted to be operated by the animal to permit the actuating of the platform, and means for temporarily closing the opening in the top or cover while the platform is within the box or casing, substantially as described.

3. In combination with a box or casing, having an opening in the top or cover thereof, a tilting platform mounted in said opening and normally closing the same, spring-actuated means connected to the platform for tilting and for returning the same to its normal position, a treadle mounted over the platform, trigger mechanism connected to said treadle and adapted to hold the platform and treadle normally in the "set" position, and means connected to the platform and operative in unison therewith for temporarily closing the opening in the box or casing when the platform is tilted, substantially as described.

4. In an animal-trap, a tilting platform mounted in the top of the box or trap, a side wall rigidly secured to the platform to temporarily close the opening normally occupied by the tilting platform, and spring-actuated means for tilting said platform within the trap and for returning same to its normal position.

5. In an animal-trap, the combination with the box or casing, of a side wall hinged to the top or cover of said box or casing, a platform mounted to swing in said top or cover, a side wall secured to said platform and adapted to temporarily close the opening normally occupied by the platform, and spring-actuated means connected to the platform for operating same to tilt or swing it within the box or casing and to return same to its normal position.

6. In combination in a trap, a box or casing, a tilting platform mounted in the top thereof, spring-actuated means connected to the platform for operating the same to tilt and to return it to its normal position, a spring-pressed bar pivotally mounted on the top of the box or casing, trigger mechanism carried by the platform for engagement with said bar to hold the platform in the "set" position, a treadle mounted above the platform and adapted to be depressed by the animal, and means carried by said treadle for engagement with the pivoted bar to release the latter from engagement with the trigger mechanism, substantially as described.

7. In combination in a trap, a box or casing, a tilting platform mounted in the top thereof, spring-actuated means connected to the platform for operating to tilt and to return it to its normal position, a spring-pressed bar pivoted on the top or cover of the box or casing, means for adjusting the position of said spring-pressed bar, a trigger mechanism carried by the platform for engagement with the spring-pressed bar, and means operated by the animal for actuating the spring-pressed bar to disengage the same from the trigger mechanism to permit the operating of the platform, substantially as described.

8. In combination in a trap, a box or casing, a tilting platform mounted in an opening provided therefor in the top or cover of the box or casing, means connected to the platform for moving the same one-quarter of a revolution and returning to its normal position, a spring-pressed bar pivoted on the box or casing, means for adjusting the position of the said bar, trigger mechanism carried by the platform for engagement with said bar, an animal-operated treadle for releasing the spring-pressed bar from engagement with the trigger mechanism, and parallel side walls extending above the platform, one of said side walls being connected to the platform and movable therewith, substantially as described.

9. In an animal-trap, a box or casing having a doorway in the rear end, a swinging door for closing said doorway, a supplemental box or casing connected to the rear end of the main box or casing and provided with a doorway registering with the doorway in the main box or casing, a swinging door for closing said latter doorway, a bail connected to the supplemental casing and adapted to lock the door in said casing, and means for detachably connecting the supplemental box or casing to the main box or casing.

10. In an animal-trap, a main box or casing having a doorway in its rear end, a supplemental box or casing detachably connected to the main box or casing and the main box or casing having a doorway registering with the doorway in the said main box or casing, a door mounted in the main box or casing to be swung upwardly to close the doorway in said main box or casing and adapted when open to lie on the bottom of the main box or casing, a door mounted in the supplemental box or casing and normally closing the doorway therein, and a bail carried by said supplemental box or casing and provided with upturned ends which engage with the door and hold the same closed when the bail is moved to the vertical position, substantially as described.

11. In an animal-trap, the combination with the main box or casing, a tilting platform arranged therein, spring-actuated means connected to said platform for tilting the same and for returning to the normal or "set" position, and a side wall connected to the tilting platform and operative therewith to temporarily close the opening normally occupied by the platform, of a supplemental box or casing detachably connected to the main box or casing, and means for establishing or closing communication between the two boxes or casings, substantially as described.

12. In an animal-trap, a box or casing, a tilting platform mounted to swing in the top of the box or casing, a side wall secured to the tilting platform, a parallel side wall hinged to the top or cover, a feed-box arranged on the top or cover of the box at one end of the side walls, trigger mechanism for holding the platform normally in the "set" position, a treadle adapted to be operated by the animal for releasing the trigger mechanism, and spring-actuated means connected to the tilting platform for tilting said platform within the box or casing when the trigger mechanism is released and for returning said platform to the set position.

In testimony whereof I affix my signature in the presence of two witnesses.

RICHARD J. DOUTHETT.

Witnesses:
 JOHN NOLAND,
 A. M. WILSON.